(12) United States Patent
Arndt et al.

(10) Patent No.: US 9,469,249 B2
(45) Date of Patent: Oct. 18, 2016

(54) WIDE ANGLE IMAGING SYSTEM FOR PROVIDING AN IMAGE OF THE SURROUNDINGS OF A VEHICLE, IN PARTICULAR A MOTOR VEHICLE

(75) Inventors: Christoph Arndt, Moerlen (DE); Urs Christen, Aachen (DE); Heike Kleinschmidt, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 653 days.

(21) Appl. No.: 12/695,554

(22) Filed: Jan. 28, 2010

(65) Prior Publication Data

US 2010/0194889 A1    Aug. 5, 2010

(30) Foreign Application Priority Data

Feb. 2, 2009 (DE) .................. 10 2009 000 550

(51) Int. Cl.
*H04N 7/18* (2006.01)
*B60R 1/00* (2006.01)
*B60R 11/04* (2006.01)

(52) U.S. Cl.
CPC .............. *B60R 1/00* (2013.01); *B60R 11/04* (2013.01); *B60R 2300/108* (2013.01); *B60R 2300/402* (2013.01)

(58) Field of Classification Search
CPC ...................................................... B60R 1/00
USPC ......... 348/148, 153, 157; 382/104, 107, 154
See application file for complete search history.

(56) References Cited

U.S. PATENT DOCUMENTS

| | | | |
|---|---|---|---|
| 4,457,584 A * | 7/1984 | Pryor ............................ | 359/471 |
| 4,756,601 A * | 7/1988 | Schroder ..................... | 359/472 |
| 4,989,078 A * | 1/1991 | Paxton ......................... | 348/47 |
| 5,063,441 A * | 11/1991 | Lipton et al. ................. | 348/47 |
| 5,142,357 A * | 8/1992 | Lipton et al. ................. | 348/48 |
| 5,307,136 A * | 4/1994 | Saneyoshi ................... | 356/3.14 |
| 5,984,475 A * | 11/1999 | Galiana et al. .............. | 351/209 |
| 6,259,359 B1* | 7/2001 | Fujinami et al. ............ | 340/435 |
| 6,922,292 B2* | 7/2005 | Bos ............................ | 359/753 |

(Continued)

FOREIGN PATENT DOCUMENTS

| | | |
|---|---|---|
| DE | 102004053416 A1 | 5/2006 |
| JP | 2006159933 A | 6/2006 |

OTHER PUBLICATIONS

State Intellectual Property Office, Notification of First Office Action for the corresponding Chinese Patent Application No. 201010100130.4 mailed Jul. 29, 2013.

(Continued)

*Primary Examiner* — Hua Fan
(74) *Attorney, Agent, or Firm* — Frank A. MacKenzie; Brooks Kushman P.C.

(57) ABSTRACT

An imaging system includes a digital camera having a sensor (such as a charge coupled device), a first lens directing a first image onto a first region of the sensor, a second lens directing a second image onto a second region of the sensor, and a third lens directing a third image onto a third region of the sensor. A display screen displays to a driver of the vehicle the first image, and a processing unit performs stereoscopic image analysis on data originating from the second and third regions. A fourth lens may be used to direct a fourth image onto a fourth region of the sensor, and the processing unit performs calculations on data from the fourth region for the detection of movement of the vehicle.

4 Claims, 4 Drawing Sheets

(56) References Cited

U.S. PATENT DOCUMENTS

| | | | |
|---|---|---|---|
| 7,131,740 B2* | 11/2006 | Nishioka | 359/862 |
| 7,266,219 B2* | 9/2007 | Okamoto et al. | 382/104 |
| 7,365,303 B2 | 4/2008 | Pallaro | |
| 7,437,244 B2* | 10/2008 | Okada | 701/301 |
| 7,457,456 B2* | 11/2008 | Miyoshi et al. | 382/154 |
| 7,982,634 B2* | 7/2011 | Arrighetti | 340/937 |
| 2002/0048086 A1* | 4/2002 | Bos | 359/566 |
| 2003/0025793 A1* | 2/2003 | McMahon | 348/148 |
| 2003/0095182 A1* | 5/2003 | Imoto | 348/148 |
| 2003/0117522 A1* | 6/2003 | Okada | 348/373 |
| 2005/0196034 A1* | 9/2005 | Hattori et al. | 382/154 |
| 2005/0259335 A1* | 11/2005 | Nishioka | 359/726 |
| 2006/0013439 A1* | 1/2006 | Takeda et al. | 382/103 |
| 2006/0029256 A1* | 2/2006 | Miyoshi et al. | 382/104 |
| 2007/0090311 A1* | 4/2007 | Pallaro | 250/574 |
| 2007/0182528 A1* | 8/2007 | Breed et al. | 340/435 |
| 2009/0160934 A1* | 6/2009 | Hendrickson et al. | 348/47 |
| 2010/0182432 A1* | 7/2010 | Augst | 348/148 |
| 2010/0188508 A1* | 7/2010 | McMahon et al. | 348/148 |
| 2010/0194889 A1* | 8/2010 | Arndt et al. | 348/148 |
| 2010/0208032 A1* | 8/2010 | Kweon | 348/36 |
| 2010/0225762 A1* | 9/2010 | Augst | 348/148 |
| 2012/0081509 A1* | 4/2012 | Kormann et al. | 348/36 |

OTHER PUBLICATIONS

State Intellectual Property Office of the People's Republic of China, Notification of Second Office Action for the corresponding Chinese Patent Application No. 201010100130.4 mailed Mar. 12, 2014.

* cited by examiner

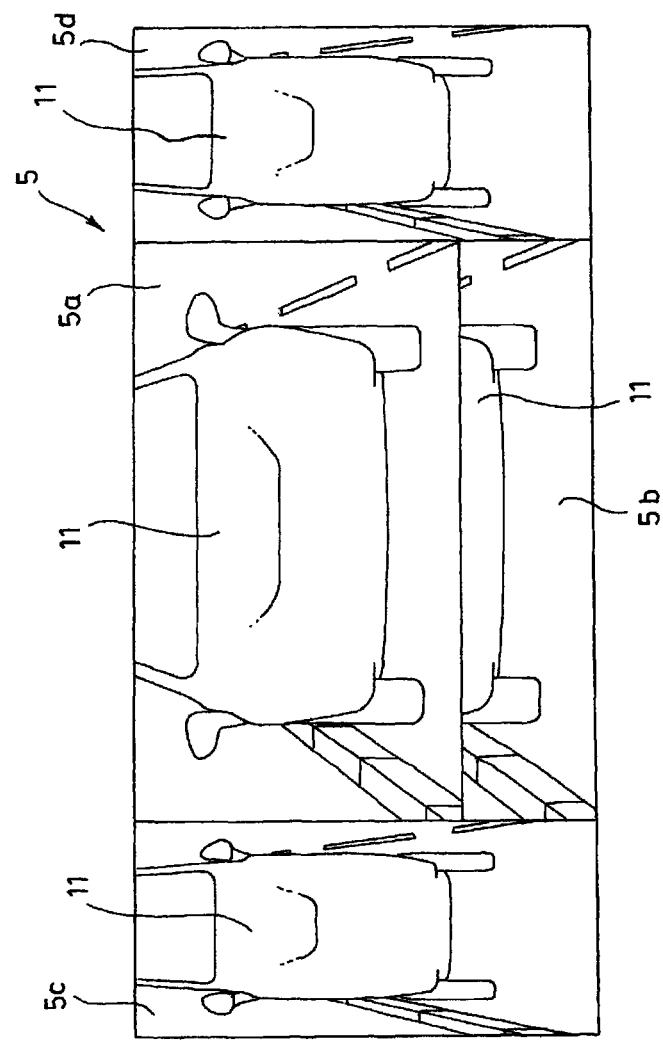

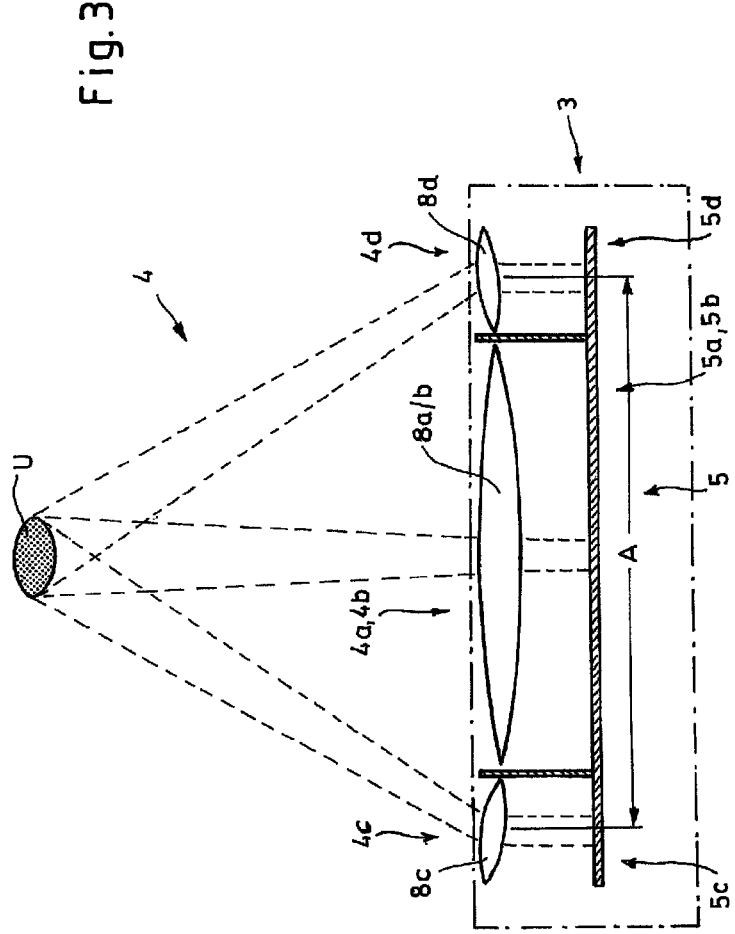

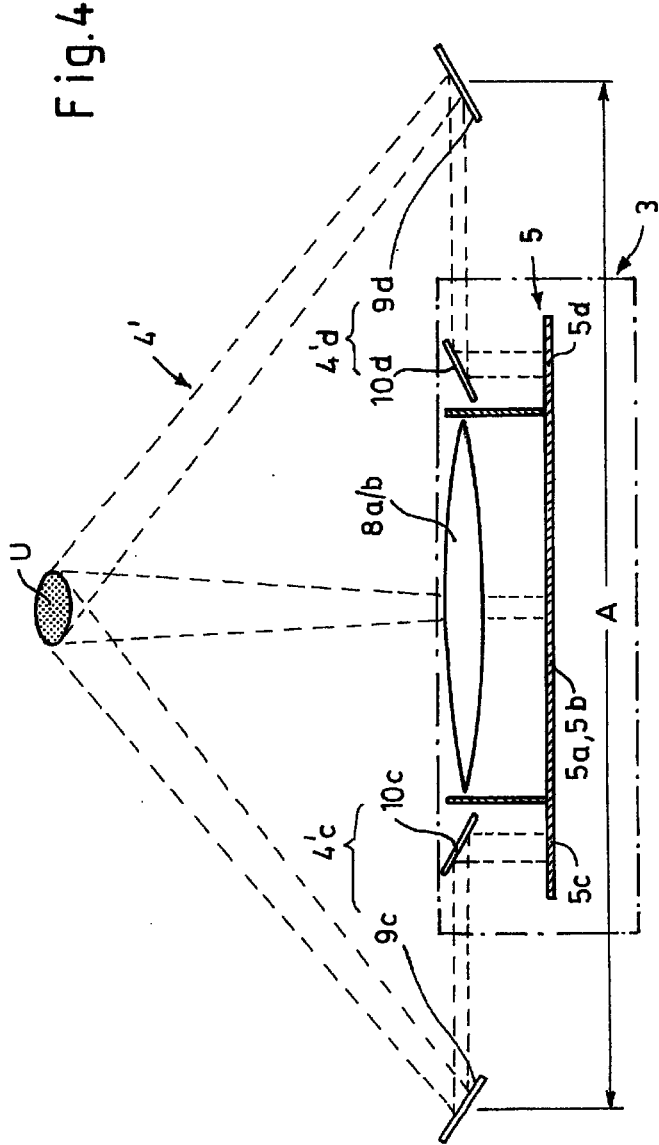

WIDE ANGLE IMAGING SYSTEM FOR PROVIDING AN IMAGE OF THE SURROUNDINGS OF A VEHICLE, IN PARTICULAR A MOTOR VEHICLE

CROSS-REFERENCE TO RELATED APPLICATIONS

This application claims foreign priority benefits under 35 U.S.C. §119(a)-(d) to DE 10 2009 000 550.1, filed on Feb. 2, 2009, which is hereby incorporated by reference in its entirety.

BACKGROUND

1. Technical Field

The invention relates to an imaging system for providing an image of the surroundings of a motor vehicle, such that this image can be displayed to the driver and simultaneously used for further evaluations by image analysis.

2. Background Art

U.S. Pat. No. 6,922,292 B2 discloses a wide angle imaging system for providing an image of the surroundings of a vehicle (for example a reversing image display device). In this case, a camera inserted into the front side or rear side of the vehicle is used together with a lens arrangement downstream thereof, in order to present the driver with a view of the surroundings imaged by the camera on a display screen in the vehicle's interior. The image is prepared by refracting and diffracting lenses together with distortion compensation by way of correction. The imaging device used has a non-uniform array of electro-optical pixels, and the display screen is provided with a uniform pixilation.

Another wide angle imaging system is disclosed in DE 10 2004 053 416 A1 which discloses a stereoscopic distance measurement system for use in a motor vehicle which has the following elements arranged in the specified sequence in the beam path of a virtual beam: a) a digital camera having an imaging optics, and having an aperture solid angle range that delimits the virtual beam emanating from the camera; b) at least one deflecting mirror element entirely or partially deflecting the virtual beam emanating from the camera; and c) at least one image field divider element having at least one divider mirror element deflecting at least a first component beam of the virtual beam emanating from the camera, the first component beam overlapping at least a second component beam of the virtual beam emanating from the camera in a restricted spatial region. The corresponding CCD element is split up into two separate regions lying one above another, of which a lower region is used for the driver display. This region and an upper region (invisible to the driver) are used together for a stereoscopic evaluation, both regions having the same resolution.

SUMMARY

In a disclosed embodiment of the invention, an imaging system for a motor vehicle comprises a digital camera having a sensor, a first lens directing a first image onto a first region of the sensor, and a second lens directing a second image onto a second region of the sensor. A display screen displays to a driver of the vehicle the first image and a processing unit processes data originating from the second region. The lens system is configured with at least two separate lenses in order to direct separate images of the surroundings on the imaging sensor as two optically different regions, of which a first region is associated with the driver display, and a second region is associated with the data processing unit for the purpose of evaluation. It is therefore possible to adapt the regions to the different requirements, and to optimize them. Thus, the lenses can be optimized independently of one another for the respective use of the regions. Thus, the region for the driver display can be a large central region of the virtual image, directed on the sensor, of the surroundings in high resolution. Thus, the driver can be provided with a central, more effectively resolved image, and the other region can be optimized for digital image processing, such as detection of relative movement between the vehicle and objects exterior to the vehicle.

The lower image segment, which is preferably used for this purpose, of the image of the surroundings on the sensor permits this in a favorable way, since the observed region comprises the substratum of the road that, in turn, includes structures (lane markings, etc.) which permit simple determination of the path and/or a deviation therefrom. The evaluation of this image region also permits the determination of the vehicle's longitudinal and transverse speeds.

In another embodiment, the digital camera further comprises a third lens directing a third image onto a third region of the sensor, and the processing unit processes data originating from the second and third regions of the sensor and performing stereoscopic image evaluation. When the lens system is configured with three independent lenses directing three separate images of the surroundings onto the imaging sensor in three different regions, of which the second and third regions are associated with the data processing unit for the purpose of stereoscopic evaluation, the second and third lenses and image regions can be optimized for stereoscopic evaluation, in particular as concerns their distortion and spacing from one another. The spacing between the lenses is important for the stereoscopic evaluation with the aid of sequentially stored images of the surroundings or their data from the sensor.

When the lens system is configured even with a further lens in order to direct the surroundings on the imaging sensor with the aid of an additional (fourth) optical region, and this additional region is associated with the data processing unit for the purpose of evaluations intended to detect movement, it is further possible to provide a direction detection unit based on an image processing unit in addition to the driver display and the stereoscopic evaluation of the determination of distance. The processing unit may detects movement and/or direction of the vehicle by analyzing lane markings, curbs, or other structures appearing in the fourth image.

In particular, the left and right hand lateral edge regions are suitable for the stereoscopic evaluation, and the lower edge region is suitable for detecting relative movement. The middle region important to the driver therefore remains in association with the driver display.

In the disclosed embodiment of the invention, the first region lies in the middle region of the image, for which the driver usually has the most interest, and so said region is associated and used with the driver display on a display screen. Additionally, information of interest to the driver such as, for example, data on path and distance etc, can be overlaid onto the visual display. Again, this region can be used for the image calibration and even detection of collision with an object, without the main function of the driver display being influenced.

The second region preferably lies at the middle lower edge. This region has also, if appropriate, already been used in the first region, or been overlapped therewith. In this region of the image, the road is included directly in front of or behind the vehicle so that the structures present there (compare above) can be used to evaluate movement, that is to say to detect the path of the vehicle by image processing.

The third and fourth regions preferably lie respectively at the left and right hand lateral edge outside the middle region. As already described above, these regions can be used for the stereoscopic evaluation. Moreover, they are also suitable for monitoring the dead angle as well as for determining a rotation (angle and angular velocity) of the vehicle by means of image processing methods.

It may therefore be advantageous for the lens system and/or respective lens to comprise prisms and/or mirrors for increasing the effective spacing of the optical regions for the purpose of evaluation, and for reducing the distortions that occur. An increase in the resolution of the stereoscopy may also be achieved.

For evaluation of the data supplied by the sensor, the data processing unit may have a buffer for the sensor data such that the data can be processed sequentially, for example during the image processing for the purpose of detecting movement and path or for stereoscopic determination of distances.

BRIEF DESCRIPTION OF THE DRAWINGS

Further details, features and advantages of the invention emerge from the following description of exemplary embodiments with the aid of the single drawing, in which:

FIG. 2 is a schematic of the division of an imaging sensor;

FIG. 3 is a schematic of the design of an embodiment of a lens system; and

FIG. 4 is a schematic of the design of an alternative embodiment of a lens system.

DETAILED DESCRIPTION

Figure 1:
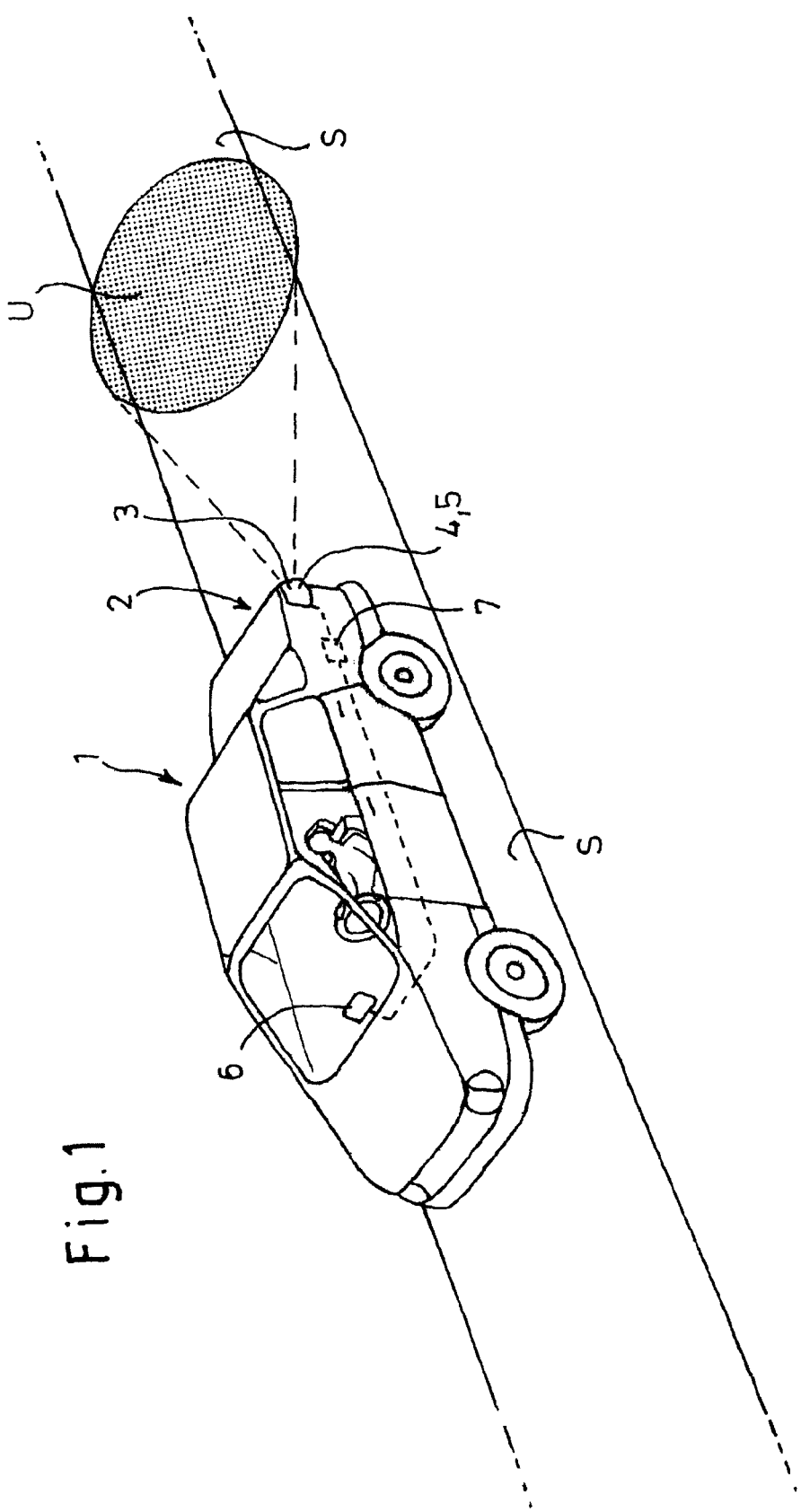
FIG. 1 is an overview schematic of a vehicle with an embodiment of a wide angle imaging system.

FIG. 1 is a schematic of a vehicle 1 having an imaging system 2 for providing an image of the vehicle surroundings U. The imaging system is able to display this image to the driver on a screen and to simultaneously digitally process the image for further evaluations.

The imaging system 2 comprises a camera 3 for imaging the surroundings U, here in particular the road S in front of or behind the vehicle 1. The camera 3 comprises a lens system 4 and a sensor 5, the lens system 4 directing multiple images of the surroundings onto the sensor 5. Sensor 5 is preferably an electronic optical sensor and may be a charge coupled device (CCD) or a complimentary metal-oxide semiconductor (CMOS) image sensor, as is well known in the field of artificial vision.

The imaging system 2 further comprises a visual display screen 6 for displaying to the driver of the vehicle the surroundings, as imaged by the camera 3 and directed onto the sensor 5 by the lens system 4. The driver is thereby enabled when driving backward to search the surroundings for objects, etc., visible on the display screen in a known way.

The imaging system 2 additionally comprises a data processing unit 7 for processing the electronic data originating from the sensor 5 for the purpose of further evaluations. The data processing unit 7 is "switched" logically between the sensor 5 and display 6, and can be embodied, with appropriate suitability, by a microprocessor, which is present in any case in the onboard electronics.

As seen in FIG. 3, the lens system 4 is configured with four lenses 4a, 4b, 4c, 4d in order to direct images of the surroundings onto the imaging sensor 5 as four optically different regions 5a, 5b, 5c, 5d (compare FIG. 2). The first region 5a is associated with the visual display screen 6. The other regions 5b, 5c, 5d are, by contrast, associated with the data processing unit 7 for digital image evaluation purposes.

Thus, the lenses 4a, 4b, 4c, 4d can be optimized independently of one another depending on the respective use of each particular region. Characteristics that may be optimized may, for example, relate to their distortion, resolution, etc. Thus, the region for the driver's visual display can be a large middle region allowing for an image of the surroundings in high resolution. The driver can thereby be provided with a central, more effectively resolved image, and it is possible for the other regions to be optimized for detection of direction and movement and/or for stereoscopic evaluation by image processing.

As seen in FIG. 2, a vehicle 11 located behind the driver's own vehicle is shown with little or no distortion in region 5a. The roadway directly behind the driver's own vehicle is illustrated in region 5b with height compression for the purpose of detecting obstacles by processing unit 7. The region behind the driver's own vehicle is illustrated in regions 5c and 5d with width compression, with in each case the same amount of compression for the purpose of stereoscopic evaluation performed by processing unit 7.

A quasi-stereoscopic evaluation is being carried out here, by means of a single camera with the aid of different camera positions (on the basis of the movement of the vehicle). The greater this inter-axis spacing between the respective central axes of the lenses, the more effective or accurate is the subsequent evaluation. The differences between the respective images on the two regions of the sensor can be used to determine angular differences between the observed objects, and to calculate a pixel displacement from them. The mutual inter-axis spacing between the two regions is known per se, and is used for the further evaluation by the processing unit.

It is also possible to combine two of more of the lenses so as, as illustrated here in the exemplary embodiment, to combine the two central lenses 4a and 4b into a combined central lens 8a/b that consists of an upper lens portion 4a and a lower lens portion 4b. The two lens portions 4a, 4b have different optical characteristics to produce the two different images in regions 5a and 5b respectively.

The first region 5a is located in this embodiment in the middle region of the sensor 5 which is usually of most interest for the driver, and so is associated with the driver's visual display on the display screen 6. The display of this image on display screen 6 can be overlaid with information of interest to the driver such as, for example, vehicle path and distance data, etc. This region 5a can also be used for the image calibration, and even for detection of collision with objects, without the main function of the driver display being influenced. The data of region 5a can also be processed, analyzed, and/or conditioned by the data processing unit 7.

The second region 5b lies at the middle lower edge, below the first region 5a. This region may, if appropriate, also already be used for the driver display together with the first region 5a.

The region 5b of may include the road directly in front of or behind the vehicle, and so the structures present there (compare above) may be used to evaluate movement, that is to say to detect the path of the vehicle, by image processing. The lower section of the image of the surroundings, which is preferably used for this purpose, on the sensor 5a permits this in a favorable way, since the observed region comprises the surface of the road which, in turn, includes structure (lane markings, lines, curbs, etc.) that allow a determination of the desired vehicle path or a deviation therefrom, and/or the determination of the longitudinal and transverse speeds.

The third and fourth regions 5c, 5d lie respectively at the left and right lateral edge outboard of the middle regions 5a and 5b. As already described above, the regions 5c, 5d may be used for stereoscopic evaluation, performed by processing unit 7. Furthermore, they are also suitable for monitoring a blind spot as well as for determining a rotation (angle and angular velocity) of the vehicle by means of image processing methods.

As best seen in FIGS. 3 and 4, the lens system is configured with independent lenses 4a, 4b, 4c, 4d in order to direct multiple images of the surroundings onto the three or four optically different regions 5a, 5b, 5c, 5d of the imaging sensor 5.

The inter-axis spacing A between the respective central axes of lenses 4c and 4d and between the respective regions 5c and 5d is significant for the stereoscopic evaluation with the aid of sequentially stored images of the surroundings, or their data from the sensor. A quasi-stereoscopic evaluation may be carried out here by means of a single camera with the aid of different camera points-of-view (on the basis of the movement of the vehicle). The greater this inter-axis spacing A, the more effective or more accurate is the subsequent evaluation. The spacing between the two regions 5c, 5d of the image of the surroundings U is used in this case to determine angular differences between the objects observed in the regions, and to calculate a pixel displacement from them. The spacing A between the two regions is known per se and is used for the further evaluation by processing unit 7.

Referring now to FIG. 4, each lens 4'c, 4'd comprises a pair of mirrors 9c, 10c and 9d, 10d respectively. The mirror pairs 9c, 10c and 9d, 10d are optically aligned to direct and focus the images onto regions 5c and 5d respectively. Other focusing lenses and/or prisms (not shown) may also be employed along with the mirrors to provide the desired optical characteristics. The outboard placement of mirrors 9c, 9d results in an increase in the effective spacing A between the optical regions for the purpose of stereoscopic evaluation. An increase in the resolution of the stereoscopy may be achieved thereby.

What is claimed:

1. An imaging system for a motor vehicle comprising:
an electro-optical sensor;
a first lens directing a first image onto a central region of the sensor;
a display screen for displaying the first image to a driver of the vehicle;
a second lens inter-axially spaced from the first lens to direct a second image onto a second region of the sensor located adjacent a first lateral edge of the sensor;
a third lens inter-axially spaced from the first lens and the second lens to direct a third image onto a third region of the sensor located adjacent a second lateral edge of the sensor, the second lateral edge positioned opposite from the first lateral edge, the second and third images having substantially equal amounts of purposeful width distortion adapted for stereoscopic image analysis;
a fourth lens inter-axially spaced from the first, the second, and the third lenses to direct a fourth image onto a fourth region of the sensor located adjacent a third edge of the sensor, the fourth image exhibiting purposeful height distortion adapted for detection of lateral vehicle movement; and
a processing unit performing stereoscopic image analysis on data originating from the second and third regions, and performing calculations on data from the fourth region to detect lateral movement of the vehicle.

2. The imaging system of claim 1, wherein the processing unit detects lateral movement of the vehicle by analyzing lane markings appearing in the fourth image.

3. The imaging system of claim 1, wherein at least one of the lenses comprises at least two mirrors optically aligned with one another.

4. The imaging system of claim 1, further comprising a data buffer associated with the processing unit.

* * * * *